(12) United States Patent
Minneman et al.

(10) Patent No.: US 7,174,083 B1
(45) Date of Patent: Feb. 6, 2007

(54) SYSTEMS AND METHODS FOR USING STRUCTURED REPRESENTATIONS TO INDEX RECORDINGS OF ACTIVITY

(75) Inventors: Scott L. Minneman, San Francisco, CA (US); William Van Melle, Los Altos, CA (US); Steve R. Harrison, Portola Valley, CA (US); Ian Emery Smith, San Francisco, CA (US); Thomas P. Moran, Palo Alto, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/223,016

(22) Filed: Dec. 30, 1998

(51) Int. Cl.
*H04N 5/91* (2006.01)

(52) U.S. Cl. .......................... 386/52; 386/95
(58) Field of Classification Search .................. 386/1, 386/45, 69–70, 125–126, 52, 95; 360/72.1, 360/72.2
See application file for complete search history.

(56) References Cited

U.S. PATENT DOCUMENTS

| | | | |
|---|---|---|---|
| 4,963,995 A * | 10/1990 | Lang ............................. | 386/54 |
| 5,164,865 A * | 11/1992 | Shaw .......................... | 360/72.2 |
| 5,307,456 A | 4/1994 | MacKay | |
| 5,317,732 A | 5/1994 | Gerlach, Jr. et al. | |
| 5,359,712 A | 10/1994 | Cohen et al. | |
| 5,371,551 A * | 12/1994 | Logan et al. ................ | 348/571 |
| 5,388,197 A | 2/1995 | Rayner | |
| 5,390,027 A * | 2/1995 | Henmi et al. .................. | 386/65 |
| 5,404,316 A | 4/1995 | Klingler et al. | |
| 5,461,711 A | 10/1995 | Wang et al. | |
| 5,546,191 A * | 8/1996 | Hibi et al. ..................... | 386/83 |
| 5,550,965 A | 8/1996 | Gabbe et al. | |
| 5,574,845 A | 11/1996 | Benson et al. | |
| 5,613,032 A * | 3/1997 | Cruz et al. ..................... | 386/69 |
| 5,625,739 A * | 4/1997 | Kotani .......................... | 386/52 |
| 5,636,078 A * | 6/1997 | Tsai ........................... | 360/72.1 |
| 5,701,383 A * | 12/1997 | Russo et al. .................. | 386/46 |
| 5,717,879 A | 2/1998 | Moran et al. | |
| 5,761,371 A * | 6/1998 | Ohno et al. ................... | 386/46 |

(Continued)

FOREIGN PATENT DOCUMENTS

EP  0 495 612 A2  7/1992

(Continued)

OTHER PUBLICATIONS

"Towards a Human Memory Prosthesis", Michael G. Lanning, Technical Report EPC-91-116, Proceedings of International Workshop Lecture Notes in Computer Science, Jul. 1991, Berlin.

(Continued)

*Primary Examiner*—Huy Nguyen
(74) *Attorney, Agent, or Firm*—Oliff & Berridge, PLC (57) ABSTRACT

The systems and methods of this invention use an index and digital audio and/or video recordings of an activity to provide access to recently recorded material. For example, users initiate audio and/or video recordings. An index, e.g., an agenda, outlines the structure of the to be recorded event. The user selects an index item as an activity that corresponds to an index item is recorded. The recordings are then associated with the index. The user can then randomly access the recordings for playback, editing or further recording. The systems and methods of this invention additionally provide the means for correlating events and the corresponding index items with the recordings.

19 Claims, 8 Drawing Sheets

U.S. PATENT DOCUMENTS

| | | | | |
|---|---|---|---|---|
| 5,826,206 | A * | 10/1998 | Nemeth | 701/35 |
| 5,833,468 | A * | 11/1998 | Guy et al. | 434/350 |
| 5,894,306 | A * | 4/1999 | Ichimura | 345/331 |
| 5,926,605 | A * | 7/1999 | Ichimura | 386/69 |
| 5,949,952 | A * | 9/1999 | Bennett et al. | 386/46 |
| 5,974,219 | A * | 10/1999 | Fujita et al. | 386/52 |
| 6,024,577 | A * | 2/2000 | Wadahama et al. | 434/322 |
| 6,052,508 | A * | 4/2000 | Mincy et al. | 386/96 |
| 6,128,014 | A * | 10/2000 | Nakagawa et al. | 345/784 |
| 6,188,831 | B1 * | 2/2001 | Ichimura | 386/69 |
| 6,282,510 | B1 * | 8/2001 | Bennett et al. | 704/235 |
| 6,385,386 | B1 * | 5/2002 | Aotake | 386/68 |
| 6,452,615 | B1 * | 9/2002 | Chiu et al. | 345/776 |

FOREIGN PATENT DOCUMENTS

| | | | |
|---|---|---|---|
| WO | WO92/22983 | * | 12/1992 |

OTHER PUBLICATIONS

"Activity-based Information Retrieval Technology in Support of Personal Memory", Michael G. Lamming et al., Technical Report EPC-91-103.1, Jan. 1992.

"Tools for Supporting the Collaborative Process", James R. Rhyne et al., Proceedings of the ACM Symposium on User Interface Software and Technology, pp. 161-170, Nov. 1992.

"Communication and Information Retrieval with a Pen-based Meeting Support Tool", Catherine G. Wolf et al., CSCW 92 Proceedings, pp. 322-329, Nov. 1992.

"Tivoli: An Electronic Whiteboard for Informal Workgroup Meetings", Elin Ronby Petersen et al., Interchi '93, pp. 391-398, Apr. 1993.

"Capturing and Playing Multimedia Events with STREAMS", Gil Cruz et al., ACM Multimedia '94, pp. 193-200, Oct. 1994.

* cited by examiner

FIG. 1

AGENDA

1. ITEM 1
2. ITEM 2
3. ITEM 3
   - 3.1 ITEM 3.1
   - 3.2 ITEM 3.2
4. ITEM 4
5. ITEM 5
   - 5.1 ITEM 5.1
     - 5.1.1. REPLAY OF ITEM 3.1
6. END

SYSTEMS AND METHODS FOR USING STRUCTURED REPRESENTATIONS TO INDEX RECORDINGS OF ACTIVITY

BACKGROUND OF THE INVENTION

1. Field of Invention

This invention is directed to systems and methods for individuals and groups to index, locate and review recently recorded events.

2. Description of Related Art

In interactions among people, conversation often ranges widely and previous topics and ideas are often forgotten. Similarly, a person performing a task can make a recording of the task to allow that person's performance to be reviewed. It is possible to make audio or video recordings as records of these interactions and actions, because of the linear nature of those records.

SUMMARY OF THE INVENTION

However, it is difficult to refer back to the previously-recorded portions of a recording of an on-going activity, especially if the user would like to immediately include a portion of the recording of the activity at a later portion of the recording that same on-going activity.

Searching a traditional audio or video tape, even if it has been produced with a time code, requires a secondary index, such as meeting notes, to find and replay those recordings within the immediate context of a meeting.

Additionally, the fine-grained synchronization of ideas and activity within a group might be the provocation for replaying some earlier recorded-material. For example, someone may ask "Where were we?" or a new participant may enter the room and join in the discussion and thus require an explanation of the current state of the discussion.

This invention provides systems and methods for using structured representations to index recordings of activity.

This invention separately provides systems and methods that allow users to index, locate and review recorded events.

This invention separately provides systems and methods that enable a user to replay a previously-recorded portion of a recording and have that replayed portion copied or added to the recording at a later point.

The systems and methods of this invention use an index and a digital audio and/or video recording to provide access to recent digitally recorded material. For example, users initiate recordings of audio and/or video data, make an index, i.e., make notes or agenda about the contents of the recordings, and use those notes to randomly access the recordings for playback.

The systems and methods of this invention additionally provide an interface that correlates events and the corresponding notes with the recordings. This interface uses visual representations that are part of the content of meetings as the basis of marking and identifying events.

Furthermore, the systems and methods of this invention provide an environment in which a user who is recording and indexing an activity can replay a previous portion of the recording of that same activity and have the previously recorded section re-recorded into the recording at the current indexing point.

In an exemplary scenario, a meeting has been called, to begin at a predetermined time. The agenda includes five items and the agenda has been input into a system according to this invention and is displayed to the participants. During the meeting, as each new agenda item is begun, the moderator "checks off" that new agenda item on the agenda index to a recording of the meeting. This creates an index to the recording indicating the checked agenda item is being discussed. A participant is called out of the meeting, and thus misses a couple of items. Following the meeting, the participant can select the agenda items that were missed. The recording of the discussion for those selected events is replayed based on the selected agenda items.

While this is a simple example, the idea has a number of powerful variations. Specifically, the index or "agenda items" might be elements of diagrams or process representations. The representations used for the index, and for retrieving segments of the recording need not contain much detail. The "agenda items" can also be used to guide participants through structured recording activities.

Continuing with the above example, as each task item on the agenda comes up for review, that agenda item is 'checked'. Following the activity, the various participants have a record of what was said about the status of tasks that may be of importance to them.

By way of another example, the systems and methods of this invention could be employed by someone repairing a complex piece of equipment. This piece of equipment has very high tolerances but the service technician may be unfamiliar with the machine. As the machine is disassembled, the technician's actions are recorded. As sub-assemblies are removed, the technician clicks on the image of the sub-assembly in the documentation on a display to create an index into the recording. During re-assembly, the technician encounters a part that does not seem to fit. The technician can then click on the image in the display. The previously-recorded removal sequence performed by that technician is replayed, to show that technician how he removed the part and thus help him replace the part.

In a further exemplary scenario, an insurance claims adjuster can use the systems and methods of this invention when examining an automobile. The claims adjuster has a video camera. The system displays an image of a claim form. It highlights sections that the adjuster should record with the video camera. The adjuster then clicks through the parts that are irrelevant to this particular claim and continues on to the next desired element.

The systems and methods of this invention actively mediate between the temporal recording and notes and records made using other media or systems. The systems and methods of this invention link images used in the supported processes with the recordings of those activities.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures, wherein.

DETAILED DESCRIPTION OF PREFERRED EMBODIMENTS

Figure 1:
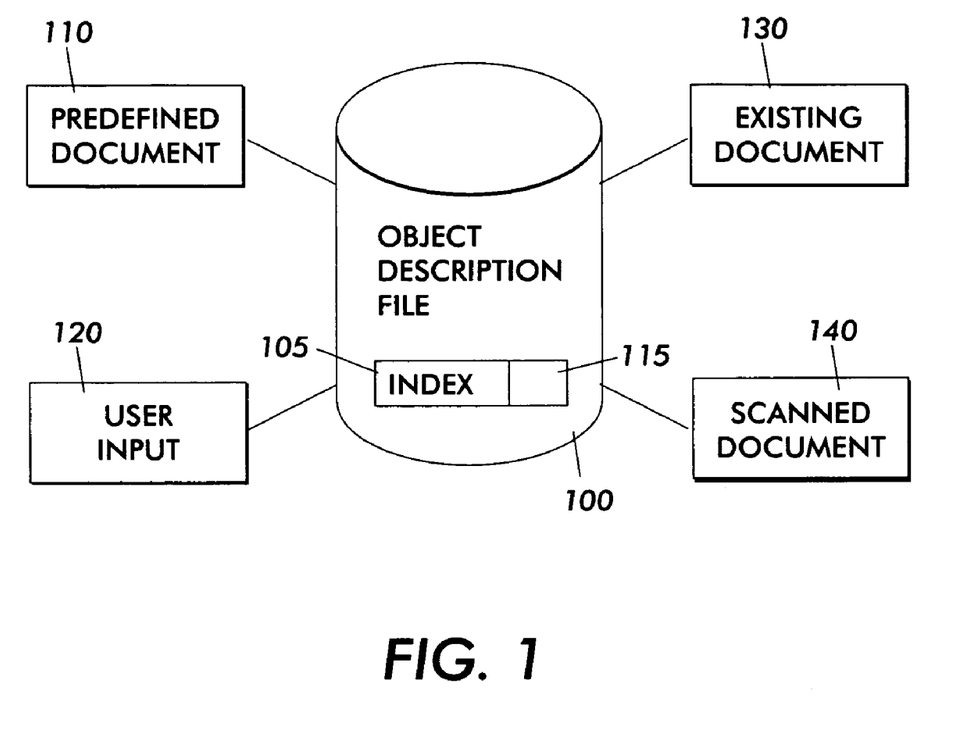
FIG. 1 is a functional block diagram of an object description file according to this invention.

FIG. 1 shows one embodiment of an object description file 100 according to this invention. The object description file 100 provides a data structure which indexes recordings of an activity. The object description file 100 is a database which stores an index 105. The index 105 can be derived from a number of sources or can be generated in real time as an activity, such as a recorded meeting, proceeds.

Specifically, the index 105 in the object description file 100 can be a predefined document 110 which is loaded into the system prior to commencement of the activity to be recorded. Furthermore, the index 105 in the object description file 100 can be generated from user input 120. In this instance, as an activity proceeds, the moderator of that activity can index, i.e., timestamp, specific portions of the recorded/recording activity and label them with a corresponding name. Additionally, the index 105 in the object description file 100 can be extracted from an already existing document 130. In this instance, the already existing document 130 can be further annotated. Furthermore, the object description file 100 can be derived from a scanned document 140 which is input to the system.

Figure 2:
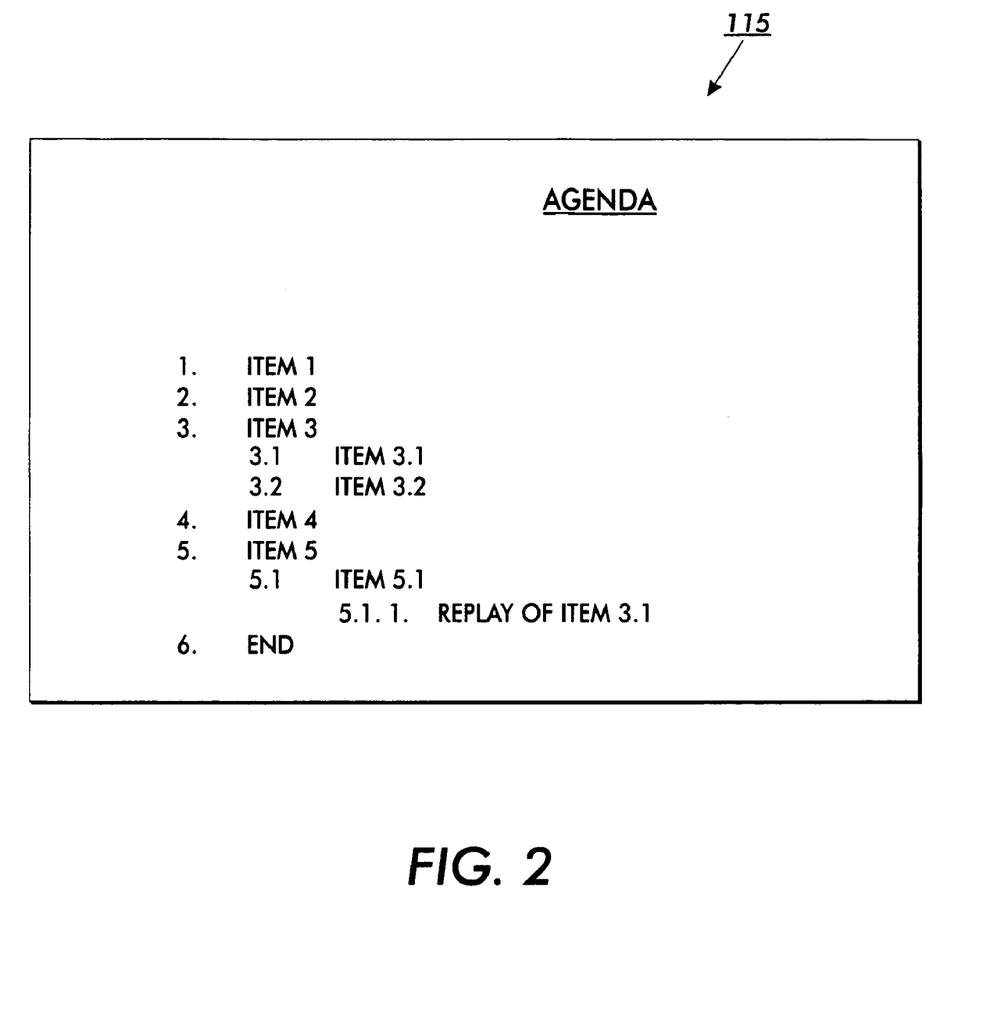
FIG. 2 is an example of an agenda.

All of these methods of input provide an object description file 100 which is an index 105, such as, for example, the agenda 115 shown in FIG. 2, for temporally tracking the recordings of an activity. FIG. 2 illustrates the exemplary agenda 115. Each item on the agenda 115 corresponds to a location in the associated audio/video recording. The agenda 115 can correspond, for example, to an already-recorded meeting as illustrated by agenda item 5.1.1. In this instance, agenda item 3.1, in whole or in part, is incorporated into the subsequent agenda item 5.1.1. If a user selects an 'item' in the agenda 115, the portion of the recorded video/audio corresponding the selected agenda item is then enabled for replay.

Figure 3:
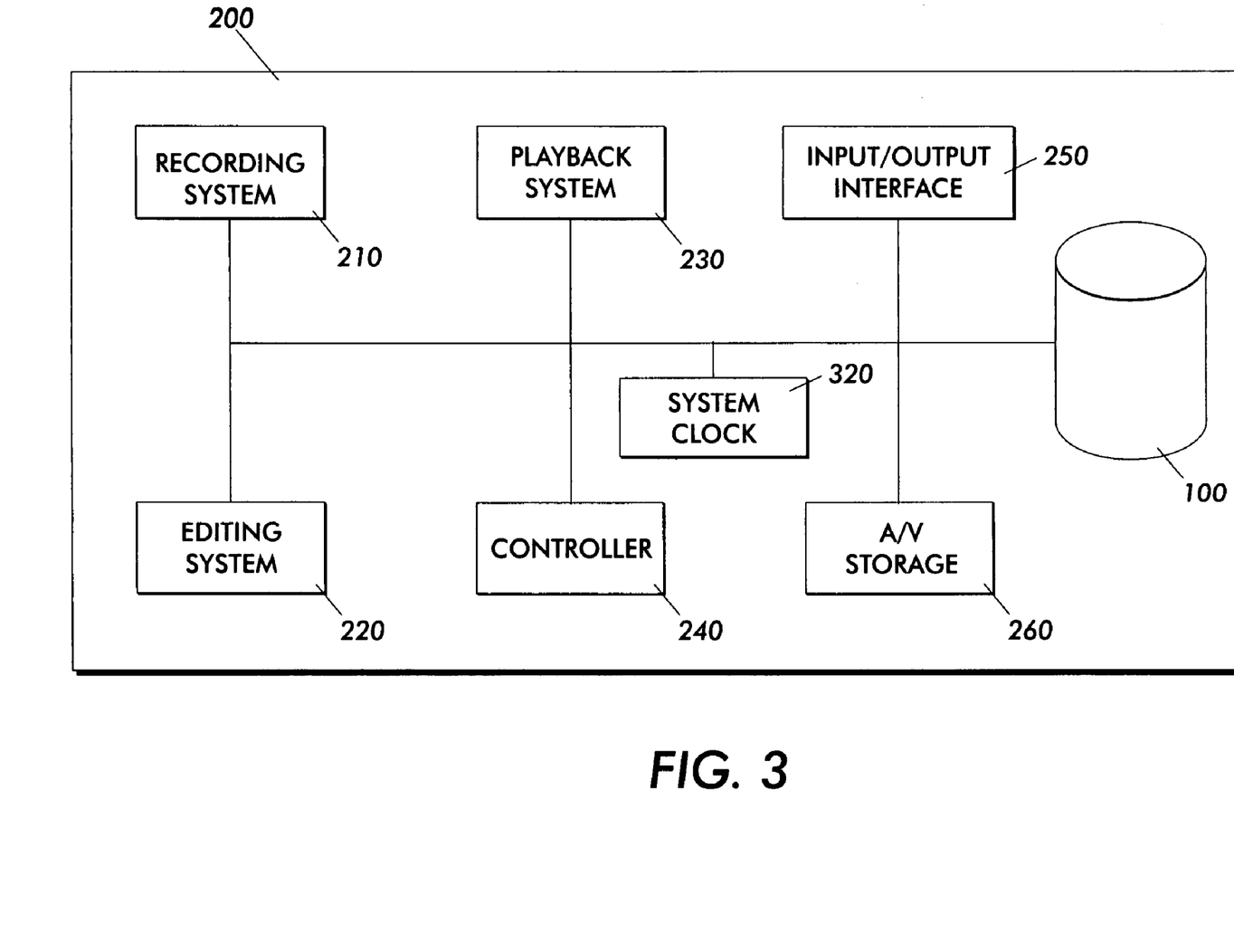
FIG. 3 is a functional block diagram of the indexed recording system according to this invention.

FIG. 3 is a block diagram of an activity indexing system 200 according to this invention. The activity indexing system 200 includes a recording subsystem 210, an editing subsystem 220, a playback subsystem 230, a controller 240, an input/output interface 250, audio/video storage 260 and the object description file 100.

The recording subsystem 210 records audio and/or video data of the activity. The editing subsystem 220 allows users to return after recording the activity to further augment the recording.

The playback subsystem 230 allows activity participants or others to view a previously-recorded activity at a later time, which may occur during the recording of the activity itself. Thus, the playback subsystem 230, in conjunction with the recording subsystem 210, allows simultaneous recording of the activity and playing back of the recording, so that activity participants may review a previously-recorded and indexed portion of the activity, while that review is simultaneously being recorded by the recording system 210 and indexed to the current index heading.

The input/output interface 250 enables communication between the activity indexing system 200 and the various types of recording and playback devices. The audio/video storage 260 is a memory device that is capable of storing audio and/or video data.

Figure 4:
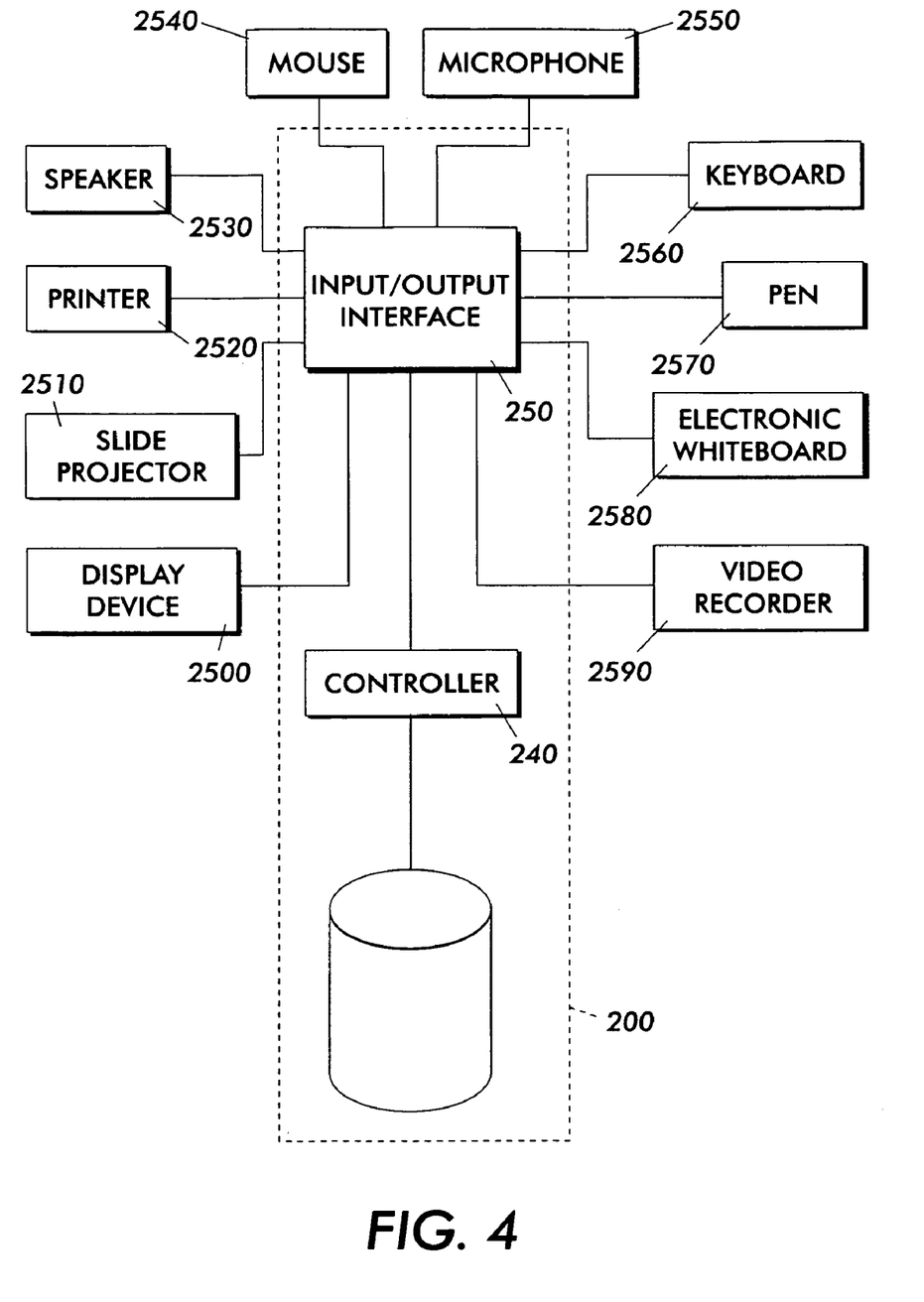
FIG. 4 is a functional block diagram of the input/output features of the indexed recording system according to this invention.

FIG. 4 shows some of the typical input/output devices that can be used in conjunction with the activity indexing system 200. The activity of the input/output devices is monitored by the controller 240 and routed through the input/output interface 250. The input/output devices can include a display device 2500, such as a TV, monitor or touch screen, a slide projector 2510, a printer 2520, a speaker 2530, a mouse 2540, a microphone 2550, a keyboard 2560, an electronic pen 2570, an electronic whiteboard 2580, a video recorder 2590 or any other device capable of receiving or conveying information between a user and the system. However, it should be appreciated that any known or later developed input/output device that is capable of recording an activity, replaying that same activity to a user, and/or recording a user's inputs, can be used in conjunction with the system.

Figure 5:
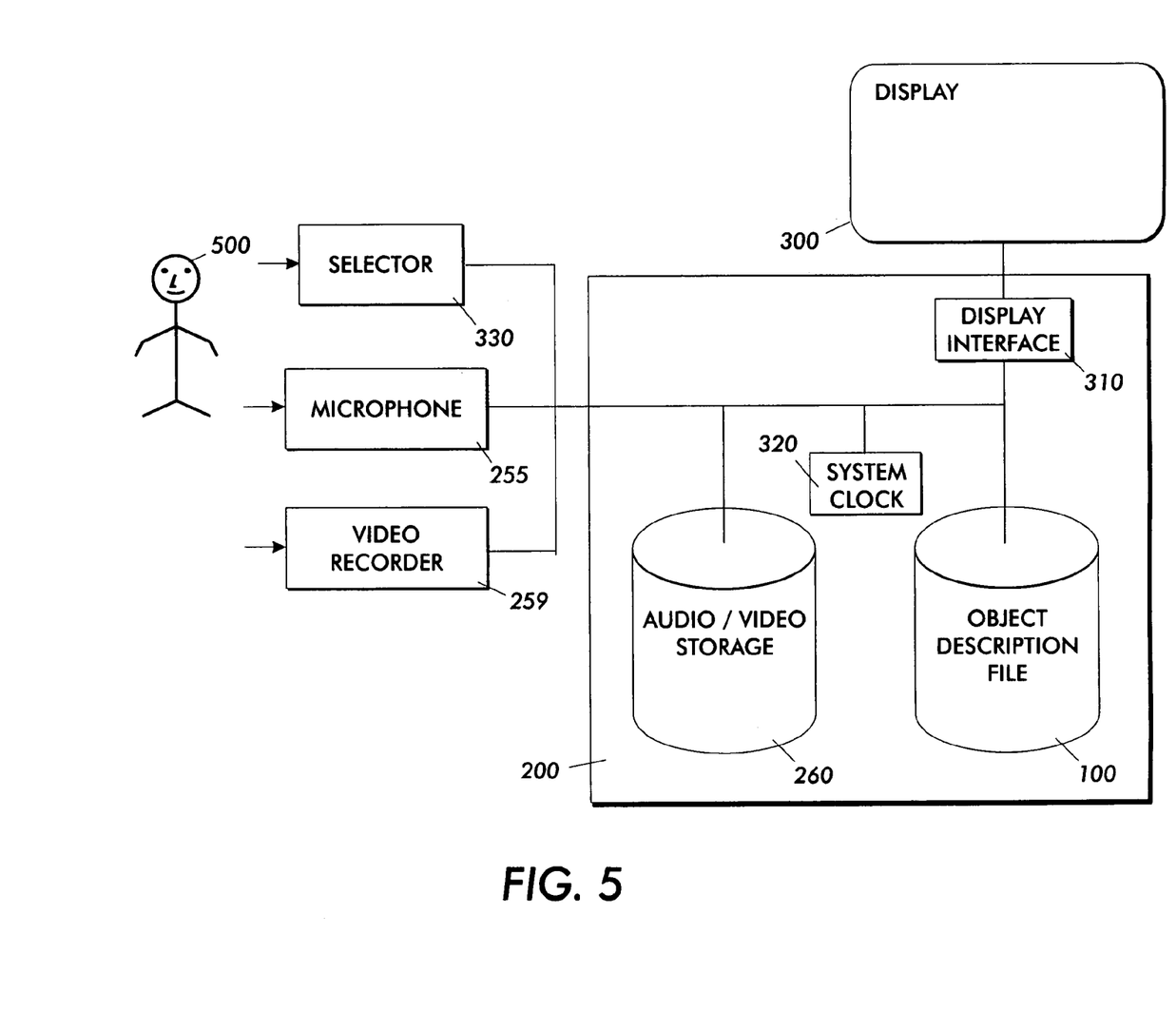
FIG. 5 is an exemplary functional block diagram of the indexed recording system according to this invention in use.

The functionality of the input/output devices in FIG. 4 becomes more apparent if viewed in conjunction with FIG. 5. FIG. 5 functionally shows how the system 200 interacts with user 500.

As described in the previous examples, a user 500 could, for example, be a service technician or a meeting moderator who wishes to record the proceedings of a particular activity. Through the input/output devices, a selector 330, a microphone 255 and a video recorder 259, the user's activities are recorded in the audio/video storage 260 via the appropriate input/output devices. It should be appreciated that this set of input devices is exemplary only and that any known or later developed input device would be used instead of or in addition to those shown in FIG. 5.

The selector 330, in response to the user's 500 actions, appropriately selects an item from the agenda 115 displayed on the display 300 to which the recorded events will be indexed. Therefore, as the activity progresses, the selected index items are associated with particular portions of the recording of the activity being recorded. In particular, the recording of the activity is indexed to the index 105 and stored in the object description file 100 in conjunction with a system clock 320. As described earlier, this indexing can occur progressively, i.e., as the user steps through an agenda which is shown, for example, on the display 300, or "on the fly." In the case of "on the fly" indexing, as new "headings" are encountered or generated during the activity, index markings associated with those activities are registered in the object description file 100.

However, it should be appreciated the activity indexing system 200 is not limited to the particular embodiment shown in FIG. 5. Specifically, any combination of known or later developed input/output devices could be used provided the selected components that allow for capturing of a particular activity. Additionally, the components should be selected to enable a user to correlate an index, such as an agenda, to the particular events as they are recorded. Thus, the device with which the user interacts to enter or indicate an index item can include, but is not limited to, a keyboard, a mouse, a joystick, a touch screen, an electronic pen, a track ball, a touch pad, or the like.

Figure 6:
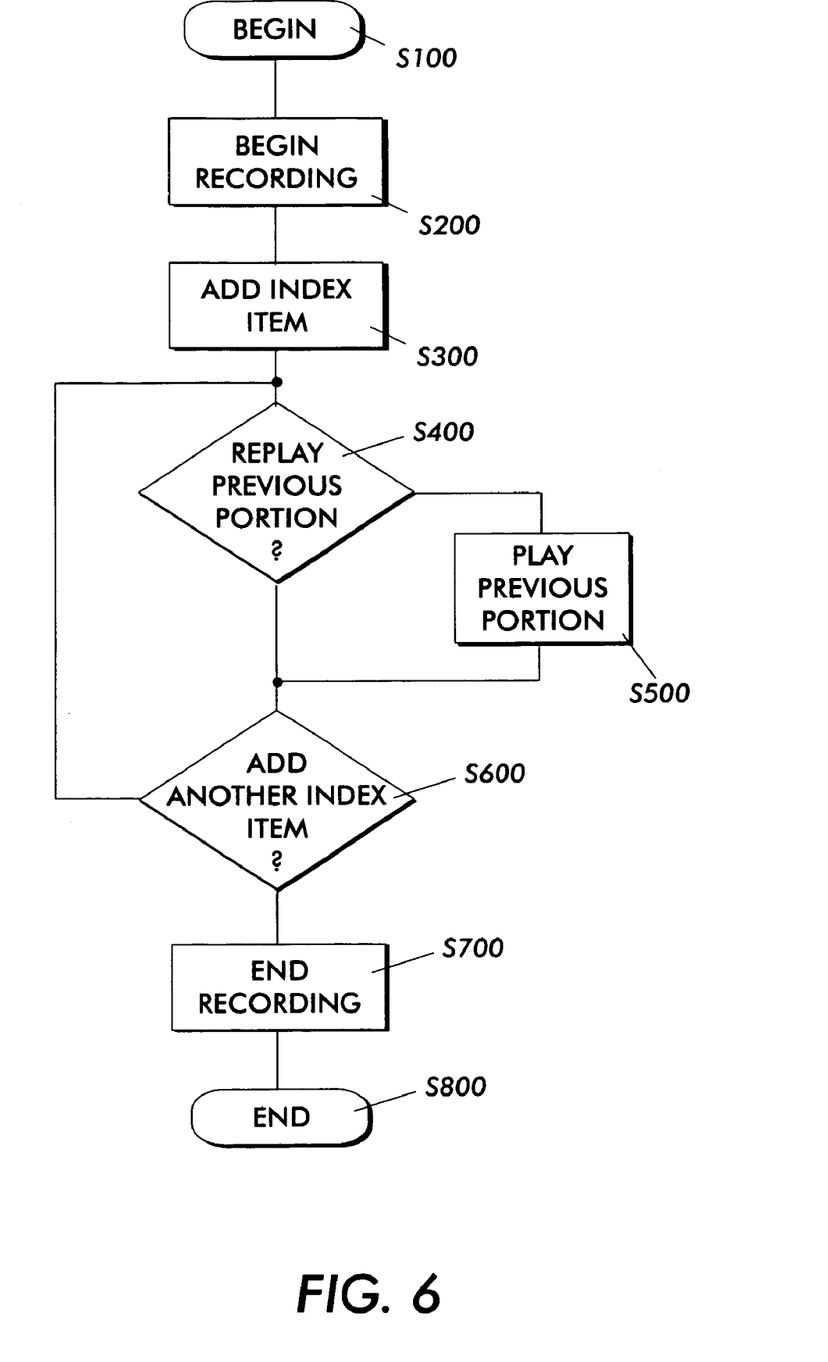
FIG. 6 is a flowchart outlining the recording, indexing, and playing process when there is no predefined agenda according to this invention.

FIG. 6 is a flowchart outlining one exemplary embodiment of an indexing method according to this invention. Specifically, FIG. 6 outlines a method of recording and indexing where there is no pre-existing agenda and the agenda is created "on the fly." Starting in step S100, control continues to step S200, where recording the user's actions begins. Next, in step S300, the user is prompted to add an index item corresponding to the currently recorded material. Then, in step S400, a determination is made whether the user wishes to replay a previous portion of the recording. If replaying a previous portion is desired, control continues to step S500. Otherwise, control jumps directly to step S600. In step S500, a previously recorded portion is replayed and the act of replaying this previously-recorded portion, and the previously-recorded portion itself, becomes part of the recording of this agenda item. Control then continues to step S600.

In step S600, a determination is made whether another index item corresponding to the now-current location of the recording is desired. If an additional index item is to be added, control jumps back to step S400. However, if additional index items are not required, control continues to step S700. In step S700, recording ends. Control then continues to step S800, where the control sequence ends.

Figure 7:
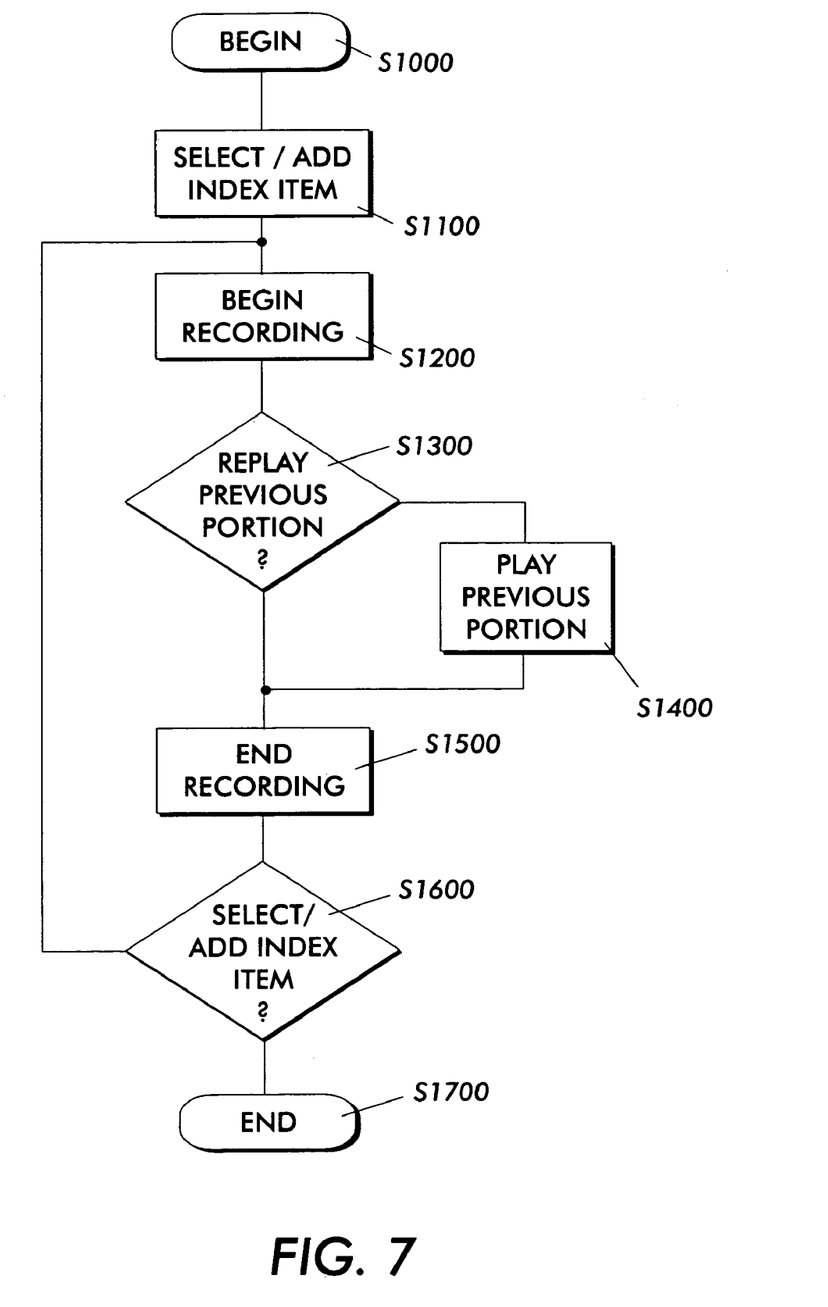
FIG. 7 is a flowchart outlining the indexing, recording, and playing process for a predefined agenda according to this invention.

FIG. 7 is a flowchart outlining another exemplary embodiment of an indexing method according to this invention. Specifically, FIG. 7 outlines a method of indexing and recording where there is a predefined agenda and recordings are made corresponding to a selected index item. Starting in step S1000, control continues to step S1100 where an object description file is initialized to provide an agenda template from which the user selects an index item or to which the user can add an index item. The recording will then be correlated to the agenda. Next, in step S1200, the recording of the activity is begun. Then, in step S1300, a determination is made whether a previous portion of the recording is to be replayed. If a previous portion is to be replayed, control continues to step S1400. Otherwise, control jumps directly to step S1500. In step S1400, a previous portion of the recording is replayed and the act of replaying this previously-recorded portion, and the previously-recorded portion itself, become part of the recording of this agenda item. Control then continues to step S1500.

In step S1500, recording of the activity relative to this agenda item ends. Then, in step S1600, a determination is made whether another index item has been selected or added. If further indexing and recording is desired, control jumps back to step S1200. Otherwise, control continues to step S1700. In step S1700, the control sequence ends.

With reference to FIGS. 6 and 7, it should be appreciated that a user can switch back and forth between these methods depending on the desired function. For example, a user, after recording a session according to the method outlined in FIG. 6, may decide to go back and add an additional index item or modify an index item using the method outlined in FIG. 7. Alternatively, after adding an index item with the method outlined in FIG. 7, a user may desire to start an entirely new recording and thus would begin with the method outlined in FIG. 6, in the instance where there is no predefined agenda, and the method outlined in FIG. 7, where there is a predefined agenda.

Figure 8:
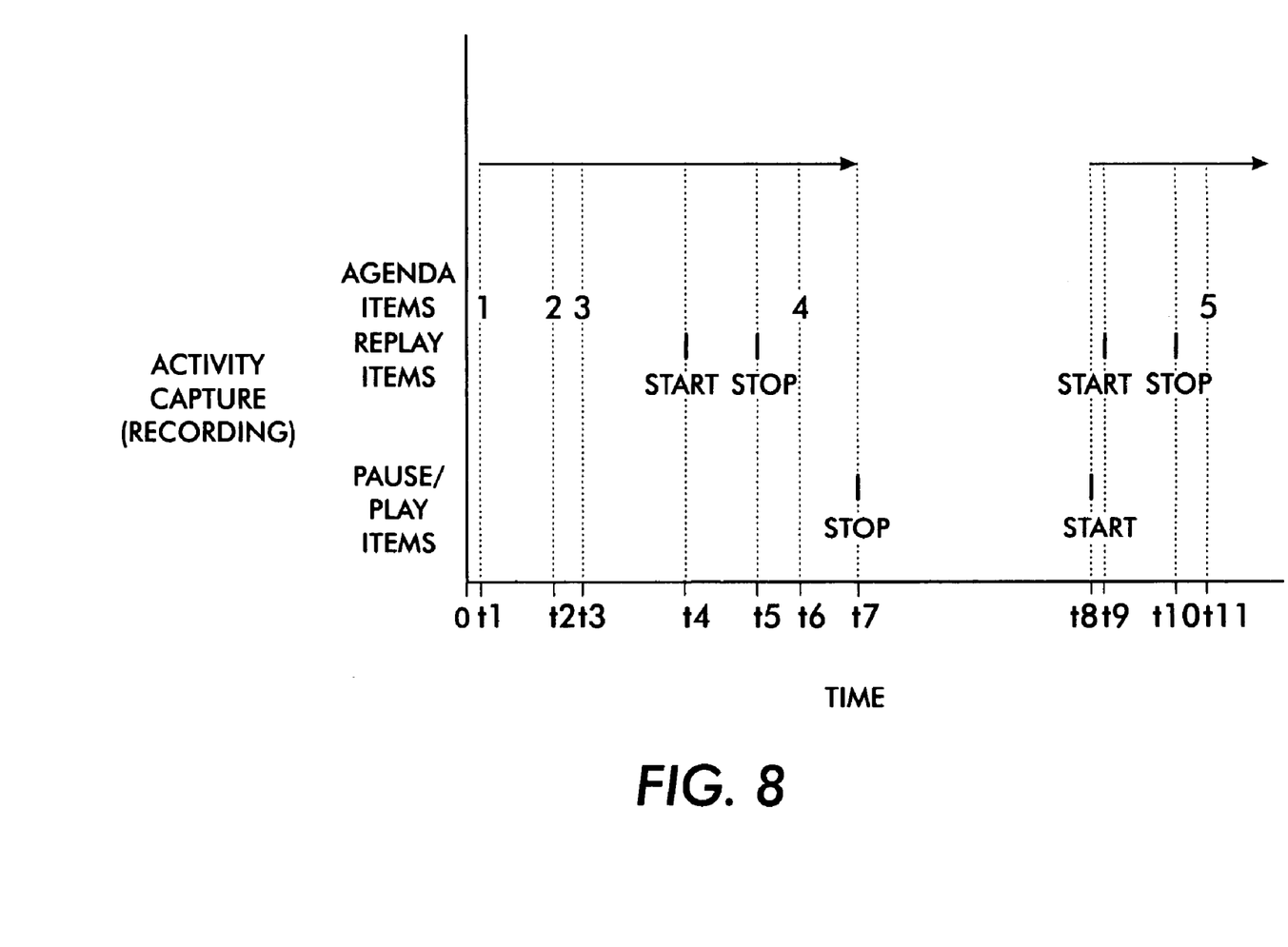
FIG. 8 is a temporal graph of an exemplary recording session.

FIG. 8 is an exemplary temporal graph illustrating how a sequence of events may occur during the recording of an activity. Specifically, as agenda items 1–5 are encountered, various start and stop control sequences are initiated to control replaying various items and pausing the recording of the activity. As shown in FIG. 8, at time t1, recording of agenda item 1 begins. Then, at time t2, recording of agenda item 2 begins. Then, at time t3 recording the agenda item 3 commences. Next, at time t4, a previously-recorded agenda item is replayed and recorded as part of the third agenda item. At time t5, the replaying of that replayed agenda item stops. Then, at time t6, new agenda item 4 is selected to index the recording.

At time t7, a stop command is encountered, pausing the recording of the activity. Next, at time t8, the recording of the activity begins again. At time t9, another previously-recorded agenda item is replayed as part of the fourth agenda item. Then, at time t10, the replaying of that previously-recorded agenda item stops. At time t11, the recording is indexed to the fifth agenda item, as the activity being recorded moves from the fourth agenda item to the fifth agenda item.

As shown in FIG. 3, the recording and playback device 200 is preferably implemented on a programmed general purpose computer. However, the recording and playback system 200 can also be implemented on a special purpose computer, a programmed microprocessor or microcontroller and peripheral integrated circuit elements, an ASIC or other integrated circuit, a digital signal processor, a hard-wired electronic or logic circuit such as a discreet element circuit, a programmable logic device such as a PLD, PLA, FPGA or PAL, or the like. In general, any device, which is capable of implementing a finite state machine that is in turn capable of implementing the flowchart shown in FIG. 6, can be used to implement either the activity indexing system 200.

It is, therefore, apparent that there has been provided in accordance with the present invention a method and apparatus for using structured representations to index recordings of activity. While this invention has been described in conjunction with preferred embodiments thereof, it is evident that many alternatives, modifications, and variations be apparent to those skilled in the art. Accordingly, applicants intend to embrace all such alternatives, modifications and variations to fall within the sphere and scope of this invention.

What is claimed is:

1. A system that uses structured representations to index recordings of activity comprising:
    a recording system that records an on-going activity;
    an indexing device that adds recordings of activity to at least one index as the activity is recorded, indexes at least a first and a second subsequent recorded portion of the on-going activity, and edits recordings of activity based on a user input;
    an object description file that stores the at least one index;
    a user input device that selects at least one item of the at least one index based on a user input during or after the recording of the activity;
    an association device that associates the selected at least one item with a recording of the activity; and
    a playback system for replaying the first indexed portion of the recording during the simultaneous recording of the current second indexed portion of the on-going activity while the replayed first indexed portion is simultaneously being re-recorded and indexed to the current second indexed portion.

2. The system of claim 1, further comprising an audio/video storage device that stores a recorded activity.

3. The system of claim 1, wherein the playback system can replay a portion of the indexed recording in response to selecting an item from the at least one index.

4. The system of claim 1, further comprising an editing system that allows modifications to a recorded activity.

5. The system of claim 1, further comprising a display device that displays at least one of the at least one index, the at least one item and the recording.

6. The system of claim 1, wherein the association device temporally associates the recording of an activity with the selected at least one item.

7. The system of claim 1, wherein the at least one index is extracted from a document input to the system.

8. The system of claim 1, the activity directed to the disassembly and subsequent reassembly of a device.

9. A method of using structured representations to represent recordings of an on-going activity, comprising the steps of:

using a recording system to record at least a first and a subsequent second portion of an on-going activity;

adding recordings of the activity to at least one index as the activity is recorded;

editing recordings of activity based on a user input during or after the recording of a portion of the activity;

indexing recordings of activity based on a user input during or after the recording of the activity;

storing the at least one index;

selecting at least one item of the at least one index based on a user input during or after the recording of a portion of the activity;

associating the selected at least one item with the first indexed portion of the recorded activity;

replaying the first indexed recording of the recorded activity with a playback system while simultaneously recording the current second indexed portion of the on-going recorded activity while the replayed first indexed portion is simultaneously being re-recorded and indexed to the current second indexed portion.

10. The method of claim 9, further comprising storing a recorded activity in an audio/video storage device.

11. The method of claim 9, wherein the playback system can replay a portion of the indexed recording in response to selecting an item from the at least one index.

12. The method of claim 9, further comprising editing a recorded activity.

13. The method of claim 9, further comprising displaying at least one of the at least one index, the at least one item and the recording.

14. The method of claim 9, further comprising temporally associating the recording of an activity with the selected at least one item.

15. The method of claim 9, wherein the recording of an activity is an audio recording.

16. The method of claim 9, wherein the recording of an activity is a video recording.

17. The method of claim 9, wherein the recording of an activity is a multimedia recording.

18. The method of claim 9, further comprising the steps of:

inputting a document into the object description file prior to recording the activity;

extracting from the document the at least one index.

19. The method of claim 9, the activity directed to the disassembly and subsequent reassembly of a device.

* * * * *